United States Patent
Sakairi et al.

(10) Patent No.: US 9,415,656 B2
(45) Date of Patent: Aug. 16, 2016

(54) SYNTHETIC RESIN-MADE SLIDE BEARING

(71) Applicants: OILES CORPORATION, Tokyo (JP);
OILES DEUTSCHLAND GMBH,
Ober-Moerlen (DE)

(72) Inventors: Yoshikazu Sakairi, Fujisawa (JP);
Katsunori Saito, Fujisawa (JP); Robert Hamrodi, Ober-Moerlen (DE); Kai Metzler, Ober-Moerlen (DE); Yoshiteru Igarashi, Ober-Moerlen (DE)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 14/783,523

(22) PCT Filed: Mar. 5, 2014

(86) PCT No.: PCT/JP2014/001216
§ 371 (c)(1),
(2) Date: Oct. 9, 2015

(87) PCT Pub. No.: WO2014/167771
PCT Pub. Date: Oct. 16, 2014

(65) Prior Publication Data
US 2016/0082800 A1  Mar. 24, 2016

(30) Foreign Application Priority Data
Apr. 11, 2013 (JP) ................. 2013-083399

(51) Int. Cl.
*F16C 17/10* (2006.01)
*B60G 15/06* (2006.01)
*F16C 33/74* (2006.01)
(Continued)

(52) U.S. Cl.
CPC ............ *B60G 15/068* (2013.01); *B60G 15/067* (2013.01); *F16C 17/10* (2013.01); *F16C 17/18* (2013.01); *F16C 33/20* (2013.01);
(Continued)

(58) Field of Classification Search
CPC .... B60G 15/068; B60G 15/067; F16C 17/10; F16C 17/18; F16C 33/20; F16C 33/74
See application file for complete search history.

(56) References Cited

U.S. PATENT DOCUMENTS

| | | | |
|---|---|---|---|
| 4,566,812 A * | 1/1986 | Takei .................. | B60G 15/068 384/484 |
| 7,993,061 B2 * | 8/2011 | Watai .................. | B60G 15/068 384/420 |

(Continued)

FOREIGN PATENT DOCUMENTS

| JP | 8-159160 | 6/1996 |
|---|---|---|
| JP | 2004-293589 | 10/2004 |

(Continued)

OTHER PUBLICATIONS

International Search Report for PCT/JP2014/001216 mailed Jun. 3, 2014, four pages.

*Primary Examiner* — Thomas R. Hannon
(74) *Attorney, Agent, or Firm* — Nixon & Vanderhye P.C.

(57) ABSTRACT

A synthetic resin-made sliding bearing 1 includes a synthetic resin-made upper casing 2 which is fixed to a vehicle body side through a mounting member; a reinforced synthetic resin-made lower casing 3 which is superposed on the upper casing 2 so as to be rotatable about an axis O in a circumferential direction R relative to the upper casing 2; and a synthetic resin-made sliding bearing piece 5 disposed in a space 4 between the upper casing 2 and the lower casing 3.

10 Claims, 11 Drawing Sheets

(51) Int. Cl.
  *F16C 33/20* (2006.01)
  *F16C 17/18* (2006.01)
(52) U.S. Cl.
  CPC .......... *F16C 33/74* (2013.01); *B60G 2204/128* (2013.01); *B60G 2204/418* (2013.01); *F16C 2326/05* (2013.01)

(56) References Cited

U.S. PATENT DOCUMENTS

| | | | | |
|---|---|---|---|---|
| 8,256,965 | B2* | 9/2012 | Kaneko | B60G 11/15 384/420 |
| 9,261,134 | B2* | 2/2016 | Morishige | F16C 17/04 |
| 2006/0215944 | A1 | 9/2006 | Watai et al. | |
| 2010/0104228 | A1* | 4/2010 | Kaneko | B60G 15/068 384/420 |
| 2011/0019951 | A1* | 1/2011 | Kaneko | B60G 11/15 384/420 |
| 2011/0135228 | A1* | 6/2011 | Kaneko | B60G 15/068 384/420 |
| 2011/0194793 | A1 | 8/2011 | Kaneko et al. | |
| 2013/0142462 | A1 | 6/2013 | Morishige et al. | |

FOREIGN PATENT DOCUMENTS

| | | |
|---|---|---|
| JP | 2009-250278 | 10/2009 |
| JP | 2010-53908 | 3/2010 |
| JP | 2011-169469 | 9/2011 |
| JP | 2012-36983 | 2/2012 |

\* cited by examiner

SYNTHETIC RESIN-MADE SLIDE BEARING

This application is the U.S. national phase of International Application No. PCT/JP2014/001216 filed 5 Mar. 2014 which designated the U.S. and claims priority to JP Patent Application No. 2013-083399 filed 11 Apr. 2013, the entire contents of each of which are hereby incorporated by reference.

TECHNICAL FIELD

The present invention relates to a synthetic resin-made sliding bearing, and more particularly to a sliding bearing which is suitably incorporated as a sliding bearing of a strut-type suspension (Macpherson type) in a four-wheeled motor vehicle.

BACKGROUND ART

In general, a strut-type suspension is mainly used for a front wheel of a four-wheeled motor vehicle, and is so arranged that a strut assembly incorporating a hydraulic shock absorber in an outer cylinder integrated with a main shaft is combined with a suspension coil spring. Among such suspensions, there is a type of structure in which the axis of the suspension coil spring is actively offset with respect to the axis of the strut, so as to allow the sliding of a piston rod of the shock absorber incorporated in the strut to be effected smoothly, and there is another type of structure in which the axis of the suspension coil spring is arranged in alignment with the axis of the strut. In either structure, a rolling bearing using balls or needles or a synthetic resin-made sliding member is disposed between a mounting member for a motor vehicle body and an upper spring seat member of the suspension coil spring to allow the rotation to be effected smoothly when the strut assembly rotates together with the suspension coil spring by the steering operation.

PRIOR ART DOCUMENTS

Patent Documents

[Patent Document 1] JP-A-2004-293589
[Patent Document 2] JP-A-2009-250278

Incidentally, since the upper spring seat member, on which the bearing is disposed, is generally made of sheet metal and is therefore relatively heavy, and since the upper spring seat member made of sheet metal needs to be provided with coating for rust prevention, even if the synthetic resin-made sliding bearing is used instead of the expensive rolling bearing to attain the light weight and a low price of the undercarriage of the motor vehicle, there are limits to such attempts for the light weight and the low price owing to the weight, manufacturing cost, assembly cost, and the like of the upper spring seat member.

In Patent Document 1, a sliding bearing is proposed which is comprised of a synthetic resin-made upper casing having a vehicle body-side bearing surface for a vehicle body side and an annular lower surface; a reinforced synthetic resin-made lower casing which contains reinforced fibers and is superposed on the upper casing so as to be rotatable about the axis of the upper casing, and which has an annular upper surface opposed to the annular lower surface of the upper casing; a synthetic resin-made annular thrust sliding bearing piece and a tubular radial bearing piece which are interposed between the annular lower surface and the annular upper surface; and a tublar radial bearing piece; wherein a spring bearing surface for a suspension coil spring is integrally formed on a portion of the lower casing on an outer peripheral side of the vehicle body-side bearing surface and the thrust sliding bearing piece.

In addition, in Patent Document 2, a thrust sliding bearing is proposed which is comprised of a synthetic resin-made upper casing which has a vehicle body-side bearing surface for a vehicle body side and an annular lower surface; a reinforced synthetic resin-made lower casing which contains reinforced fibers and is superposed on the upper casing so as to be rotatable about an axis of the upper casing, and on which an annular upper surface opposed to the annular lower surface and a spring bearing surface for a suspension coil spring are integrally formed; and a thrust sliding bearing piece which is disposed in an annular gap between the annular lower surface and the annular upper surface and has an annular thrust sliding bearing surface which is slidably brought into contact with at least one of the annular lower surface and the annular upper surface, wherein the vehicle body-side bearing surface, the thrust sliding bearing surface, and the spring bearing surface are arranged by being juxtaposed to each other in an axial direction.

According to these sliding bearings, since the reinforced synthetic resin-made lower casing containing reinforced fibers has the spring bearing surface for the suspension coil spring, it is possible to omit the upper spring seat member made of sheet metal, so that it is possible to eliminate a weight increase ascribable to the upper spring seat member made of sheet metal and a price increase ascribable to such as the fabrication, coating, and assembly of the upper spring seat member made of sheet metal, thereby making it possible to attain the light weight and a low price of the undercarriage of the motor vehicle.

SUMMARY OF THE INVENTION

Problems that the Invention is to Solve

However, since the lower casing, which is the sliding mating surface of the sliding bearing piece, is formed of a reinforced synthetic resin containing a reinforcing filler such as glass fibers, if sliding occurs between the synthetic resin-made sliding bearing piece and the lower casing, a problem can possibly occur in that the thrust sliding bearing piece is worn down by the lower casing, thereby causing durability and the smoothness of the steering operation to decline.

The present invention has been devised in view of the above-described aspects, and its object is to provide a synthetic resin-made sliding bearing which is capable of avoiding the sliding between the synthetic resin-made sliding bearing piece and the reinforced synthetic resin-made lower casing containing a reinforcing filler such as glass fibers, thereby making it possible to maintain smooth steering operation.

Means for Overcoming the Problems

A synthetic resin-made sliding bearing in accordance with the present invention comprises: a synthetic resin-made upper casing, a reinforced synthetic resin-made lower casing superposed on the upper casing so as to be rotatable about an axis relative to the upper casing, and a synthetic resin-made sliding bearing piece disposed between the upper casing and the lower casing, wherein the upper casing includes: an annular upper casing base portion; an inner cylindrical suspended portion which has a first cylindrical outer peripheral surface continuously connected to an annular lower surface of the upper casing base portion and is suspended from an inner edge portion of the annular lower surface of the upper casing base portion; a cylindrical engaging suspended portion which is suspended from an outer edge portion of the annular lower surface of the upper casing base portion and has an engaging bulged portion at a lower portion of a first cylindrical inner peripheral surface continuously connected to the annular lower surface of the upper casing base portion; and an outer cylindrical suspended portion suspended from the annular lower surface of the upper casing base portion so as to form a first cylindrical recessed portion in cooperation with the cylindrical engaging suspended portion and the upper casing base portion, wherein the lower casing includes: an annular lower casing base portion; a corrugated meshing portion which is formed with first projecting portions and indented portions and alternately arranged on an annular upper surface of the lower casing base portion along a circumferential direction about the axis; a cylindrical protrusion protruding from the annular upper surface of the lower casing base portion; and a cylindrical engaged protruding portion having an engaged bulged portion on an upper portion of a second cylindrical outer peripheral surface and projecting from an outer edge portion of the annular upper surface of the lower casing base portion so as to form a second cylindrical recessed portion in cooperation with the cylindrical protrusion and the lower casing base portion, and wherein the sliding bearing piece includes: a thrust sliding bearing piece portion having an annular lower surface which is brought into contact with the annular upper surface of the lower casing base portion and an annular upper surface which is slidably brought into contact with the annular lower surface of the upper casing base portion; a cylindrical radial sliding bearing piece portion suspended from an inner edge portion of the annular lower surface of the thrust sliding bearing piece portion and having a second cylindrical inner peripheral surface which is slidably brought into contact with the first cylindrical outer peripheral surface of the first cylindrical suspended portion; and a corrugated meshed portion which is formed with second projecting portions and indented portions alternately arranged on the annular lower surface of the thrust sliding bearing piece portion along the circumferential direction about the axis, and which is meshed with the corrugated meshing portion such that the rotation about the axis relative to the lower casing is prevented by the lower casing, the upper casing being combined with the lower casing by disposing the cylindrical engaged protruding portion in the first cylindrical recessed portion, by disposing the outer cylindrical suspended portion in the second cylindrical recessed portion, and by resiliently fitting the engaging bulged portion to the engaged bulged portion.

According to such a synthetic resin-made sliding bearing, since the sliding bearing piece is integrated with the lower casing by being provided with a corrugated meshed portion which is formed with second projecting portions and indented portions alternately arranged on the annular lower surface of the thrust sliding bearing piece portion along the circumferential direction about the axis, and which is meshed with the corrugated meshing portion such that the rotation about the axis relative to the lower casing is prevented by the lower casing. Therefore, in the rotation of the lower casing about the axis relative to the upper casing, sliding is confined to the sliding between the synthetic resins excellent in the sliding characteristics, i.e., between the annular upper surface of the thrust sliding bearing piece portion and the annular lower surface of the upper casing base portion and between the second cylindrical inner peripheral surface of the radial sliding bearing piece portion and the first cylindrical outer peripheral surface of the first cylindrical suspended portion of the upper casing.

In the synthetic resin-made sliding bearing in accordance with the present invention, the upper casing includes an inner cylindrical small suspended portion suspended from an annular lower end face of the inner cylindrical suspended portion and an outer cylindrical small suspended portion suspended from an annular lower surface of the inner cylindrical suspended portion to form a third cylindrical recessed portion in cooperation with the inner cylindrical small suspended portion and the inner cylindrical suspended portion, the lower casing includes a cylindrical suspended portion suspended from an inner edge portion of the annular lower surface of the lower casing base portion, a first annular jutting portion jutting radially inwardly from a cylindrical inner peripheral surface of the cylindrical suspended portion, another cylindrical protrusion protruding from an annular upper surface of the first annular jutting portion to form a fourth cylindrical recessed portion in cooperation with the lower casing base portion and the first annular jutting portion, and a second annular jutting portion jutting radially inwardly from a lower edge portion of a cylindrical inner peripheral surface of the first annular jutting portion, and the upper casing may be combined with the lower casing by disposing the other cylindrical protrusion of the lower casing in the third cylindrical recessed portion.

According to such a synthetic resin-made sliding bearing, the upper casing is combined with the lower casing by disposing the cylindrical engaged protruding portion in the first cylindrical recessed portion, by disposing the outer cylindrical suspended portion in the second cylindrical recessed portion, and by resiliently fitting the engaging bulged portion to the engaged bulged portion; furthermore, the upper casing is combined with the lower casing by disposing the other cylindrical protrusion of the lower casing in the third cylindrical recessed portion. Therefore, labyrinths are formed therein, with the result that the ingress of dust and the like onto the sliding surfaces between the annular upper surface of the thrust sliding bearing piece portion and the annular lower surface of the upper casing and between the second cylindrical inner peripheral surface of the radial sliding bearing piece portion and the first cylindrical outer peripheral surface of the first cylindrical suspended portion of the upper casing is prevented by such labyrinths, thereby making it possible to prevent as practically as possible a decline in the sliding characteristics due to the ingress of dust and the like onto these sliding surfaces.

In the synthetic resin-made sliding bearing in accordance with the present invention, the thrust sliding bearing piece portion may have pluralities of inner recessed portions and outer recessed portions which are formed in an annular upper surface thereof along the circumferential direction about the axis and in at least two rows including an inner row and an outer row in the radial direction, in which case the inner recessed portions and the outer recessed portions may be arranged with phase differences with respect to each other in the circumferential direction about the axis, and the radial sliding bearing piece portion may have a plurality of axial grooves which are formed in a second cylindrical inner peripheral surface thereof in such a manner as to be spaced apart at equal intervals in the circumferential direction about the axis and are open at their both ends in a vertical direction.

In a preferred example, each of the plurality of inner recessed portions is defined by an inner circular arc-shaped wall surface extending in a circular arc shape about the axis as a center; an outer circular arc-shaped wall surface extending in a circular arc shape about the axis as a center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces. Further, each of the plurality of outer recessed portions is defined by an inner circular arc-shaped wall surface extending in a circular arc shape about the axis as the center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces.

In another preferred example, the thrust sliding bearing piece portion has at least two annular recessed grooves, including an inner annular recessed groove and an outer recessed groove, which are formed in an annular upper surface thereof concentrically with each other in such a manner as to extend along the circumferential direction about the axis.

It suffices if the ratio of a total area of opening surfaces of the pluralities of inner recessed portions and outer recessed portions, which are adapted to retain a lubricant such as grease, in surfaces combining the opening surfaces of the pluralities of inner recessed portions and outer recessed portions and the annular upper surface of the thrust sliding bearing piece portion, and the ratio of a total area of opening surfaces of the at least two annular recessed grooves, including the inner annular recessed groove and the outer annular recessed groove, in surfaces combining the opening surfaces of the at least two annular recessed grooves, including the inner annular recessed groove and the outer annular recessed groove, and the annular upper surface of the thrust sliding bearing piece portion, is at least 20%. If these ratios exceed 50%, a decline in the strength of the thrust sliding bearing piece portion is entailed, and plastic deformation such as creep is liable to occur in the thrust sliding bearing piece portion, and therefore these ratios are preferably 20% to 50%.

The plurality of axial grooves, which are formed in the second cylindrical inner peripheral surface of the radial sliding bearing piece portion in such a manner as to be spaced apart at equal intervals in the circumferential direction about the axis and are open at their both ends in the vertical direction, may also serve as a sump section for retaining the lubricant such as grease.

In the synthetic resin-made sliding bearing in accordance with the present invention, the lower casing base portion may further have an annular recessed portion formed in an annular upper surface thereof in the circumferential direction about the axis, in which case the first projecting portions and indented portions of the corrugated meshing portion are formed on the annular upper surface of the lower casing base portion in the annular recessed portion, and the corrugated meshing portion may be meshed with the corrugated meshed portion in the annular recessed portion. In substitution for or in conjunction with these arrangements, the thrust sliding bearing piece portion may further have an annular recessed portion formed in an annular lower surface thereof in the circumferential direction about the axis, in which case the second projecting portions and indented portions of the corrugated meshed portion are formed on the annular lower surface of the thrust sliding bearing piece portion in the annular recessed portion, and the corrugated meshed portion may be meshed with the corrugated meshing portion in the annular recessed portion.

The synthetic resin-made sliding bearing in accordance with the present invention is preferably used as a sliding bearing for a strut-type suspension of a four-wheeled motor vehicle.

The synthetic resin for forming the upper casing may be a thermoplastic synthetic resin such as polyacetal resin, polyamide resin, or polybutylene terephthalate resin, and the synthetic resin for forming the lower casing may be a reinforced thermoplastic synthetic resin such as polyacetal resin, polyamide resin, or polybutylene terephthalate resin containing 30 to 50% by mass of a reinforcing filler including glass fibers, glass powder, carbon fibers, and the like. As the synthetic resin for forming the sliding bearing piece, it is possible to cite a thermoplastic synthetic resin such as polyolefin resin including polyacetal resin, polyamide resin, polybutylene terephthalate resin, and polyester resin as preferred examples.

Advantages of the Invention

According to the present invention, it is possible to provide a synthetic resin-made sliding bearing which is capable of avoiding the sliding between the synthetic resin-made sliding bearing piece and the reinforced synthetic resin-made lower casing containing a reinforcing filler such as glass fibers, thereby making it possible to maintain smooth steering operation.

MODE FOR CARRYING OUT THE INVENTION

Figure 1:
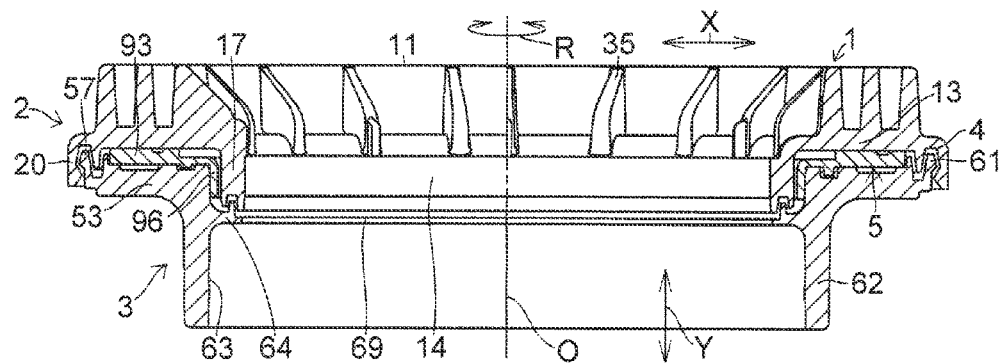
FIG. 1 is an explanatory cross-sectional view, taken in the direction of arrows along line I-I shown in FIG. 2, of a preferred embodiment of the present invention.
Figure 2:
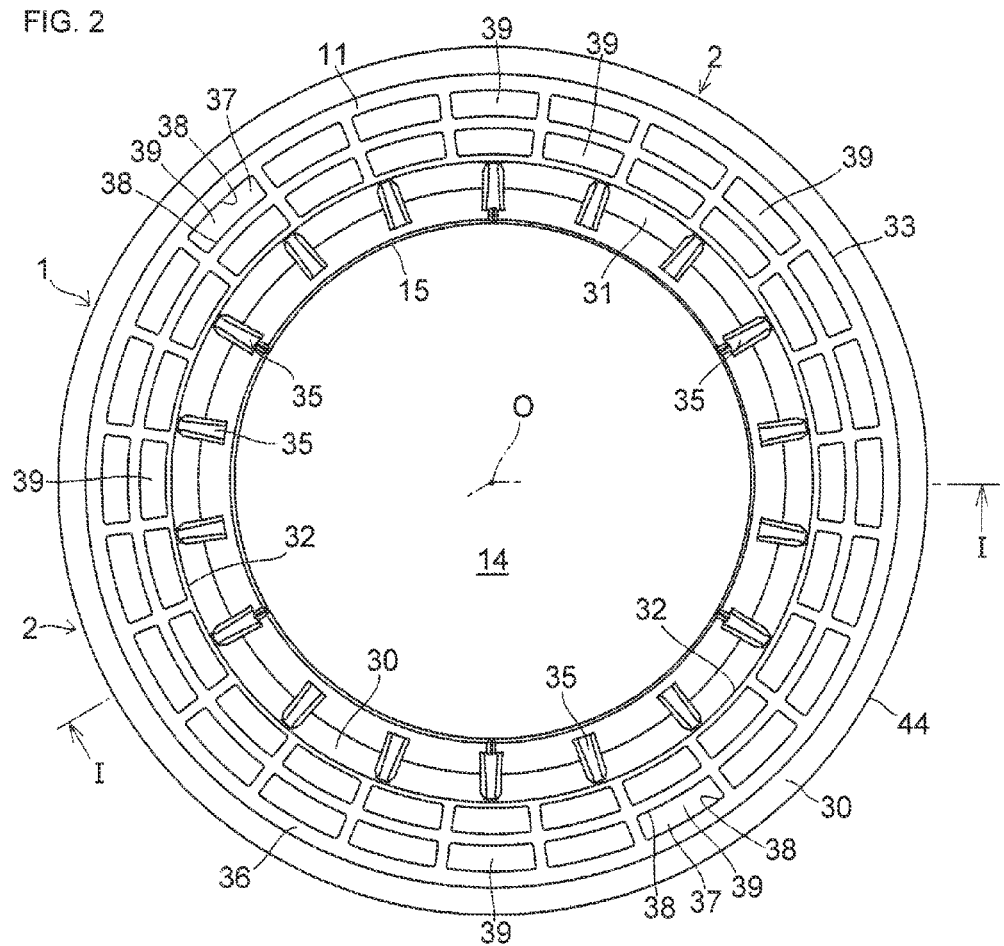
FIG. 2 is an explanatory plan view of the embodiment shown in FIG. 1.
Figure 3:
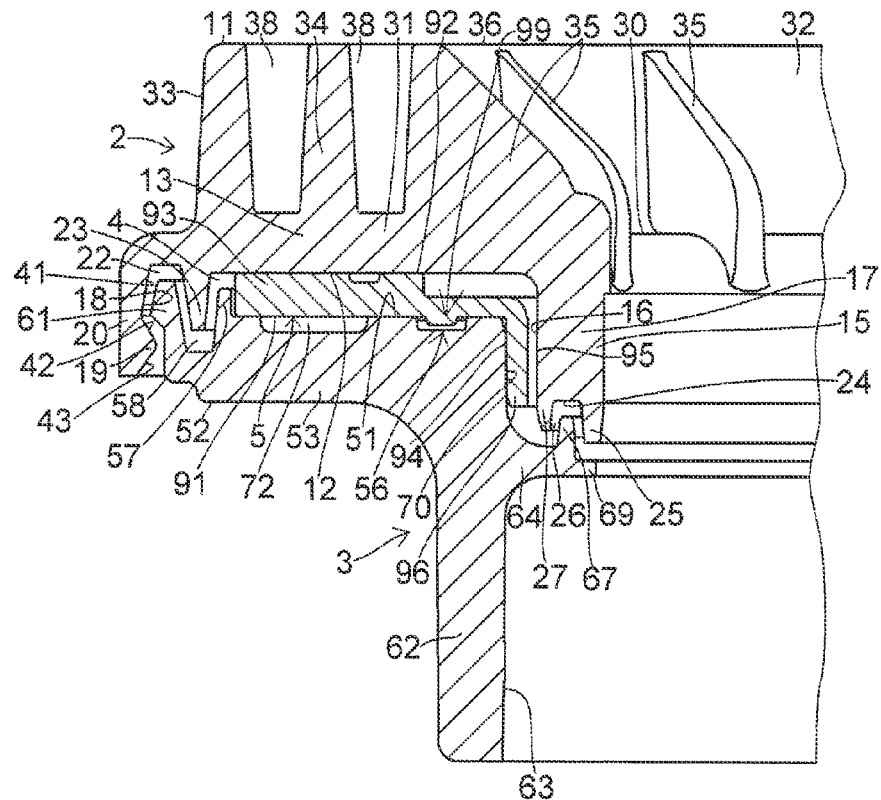
FIG. 3 is an explanatory partially enlarged cross-sectional view of the embodiment shown in FIG. 1.

In FIGS. 1 to 3, a synthetic resin-made sliding bearing 1 in accordance with this embodiment for use in a strut-type suspension of a four-wheeled motor vehicle is comprised of a synthetic resin-made upper casing 2 which is fixed to the vehicle body side through a mounting member; a reinforced synthetic resin-made lower casing 3 which is superposed on the upper casing 2 so as to be rotatable about an axis O in a circumferential direction R relative to the upper casing 2; and a synthetic resin-made sliding bearing piece 5 disposed in a space 4 between the upper casing 2 and the lower casing 3.

Figure 4:
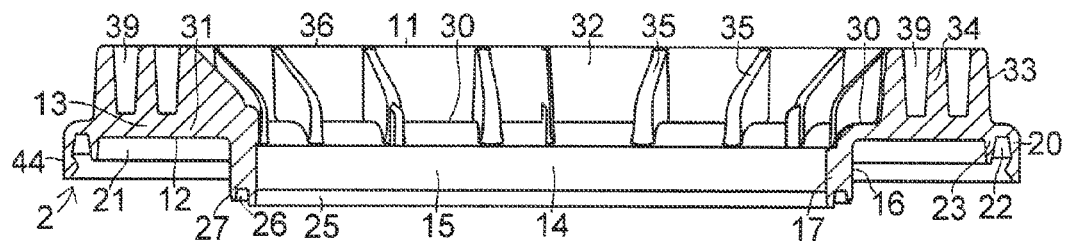
FIG. 4 is an explanatory cross-sectional view of an upper casing of the embodiment shown in FIG. 1.
Figure 5:
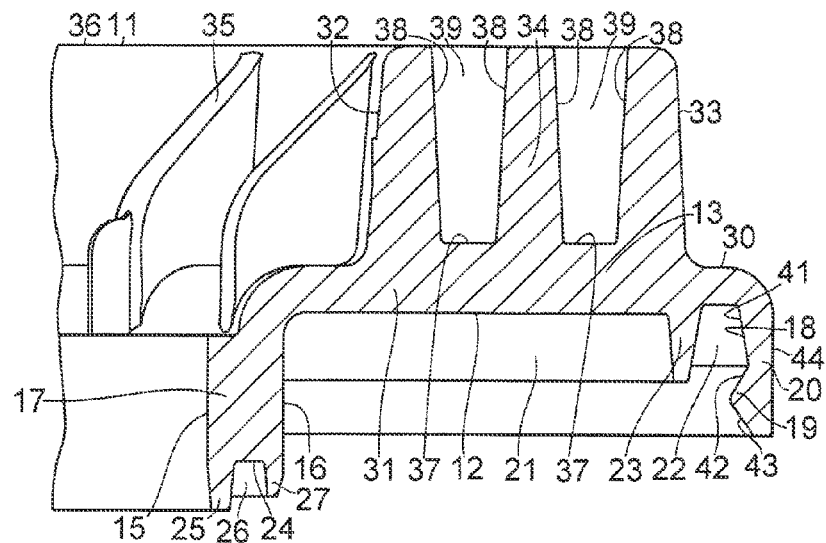
FIG. 5 is an explanatory partially enlarged cross-sectional view of the upper casing shown in FIG. 4.
Figure 6:
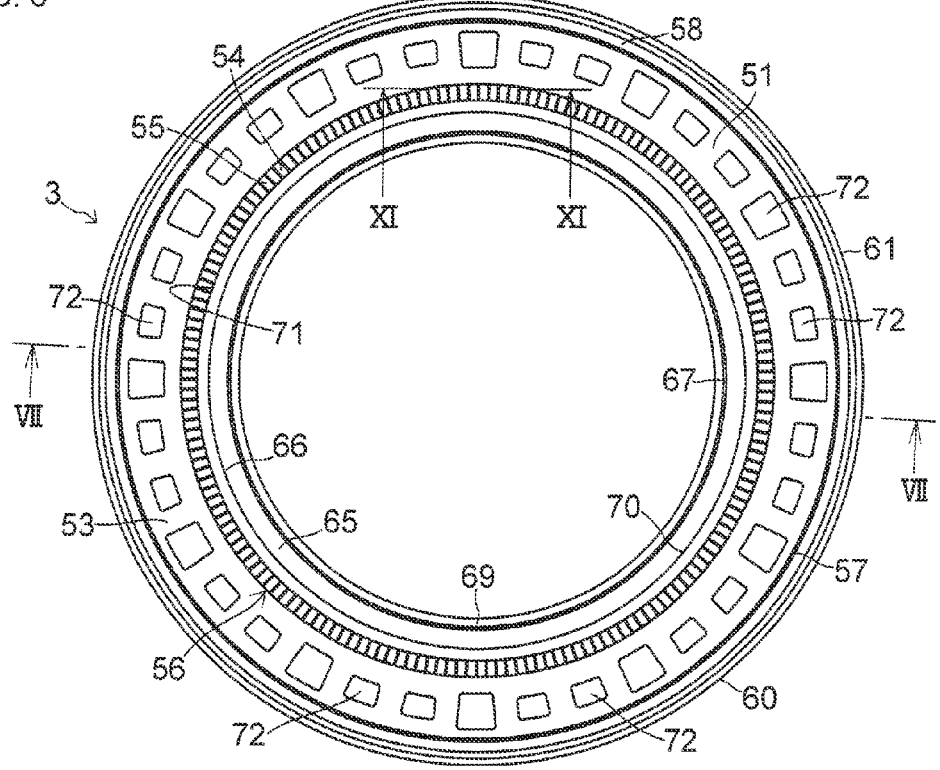
FIG. 6 is an explanatory plan view of a lower casing of the embodiment shown in FIG. 1.
Figure 7:
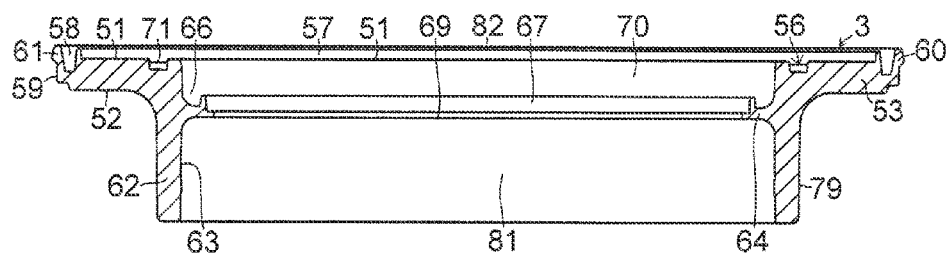
FIG. 7 is an explanatory cross-sectional view, taken in the direction of arrows along line VII-VII, of the lower casing of the embodiment shown in FIG. 6.
Figure 8:
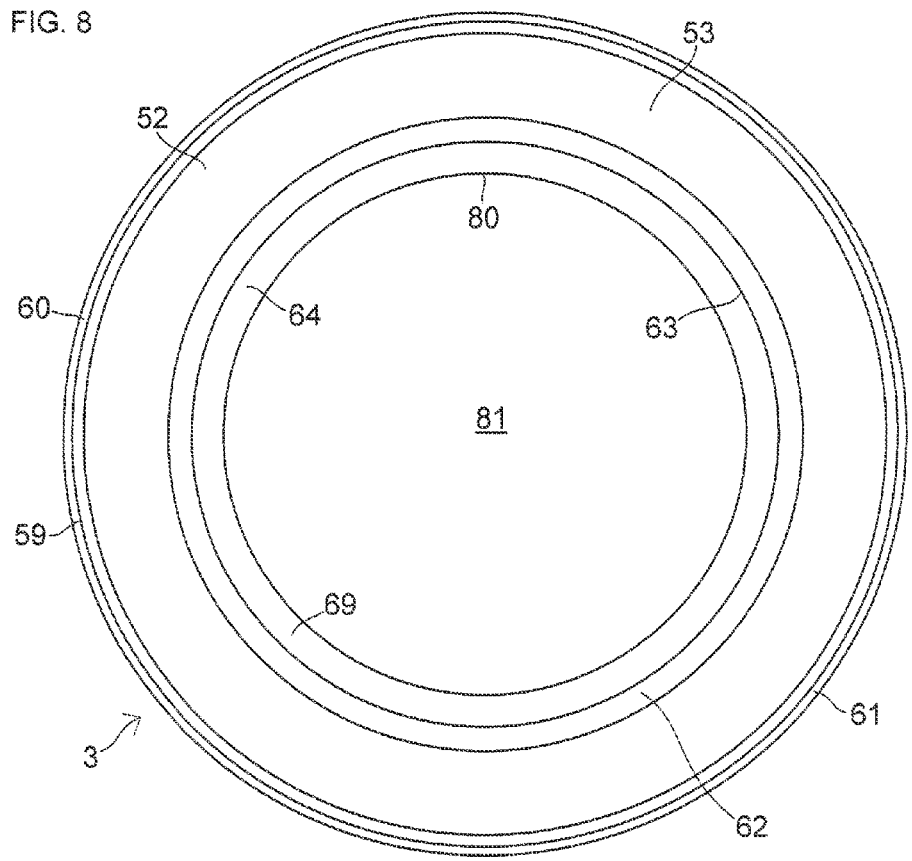
FIG. 8 is an explanatory bottom view of the lower casing shown in FIG. 6.
Figure 9:
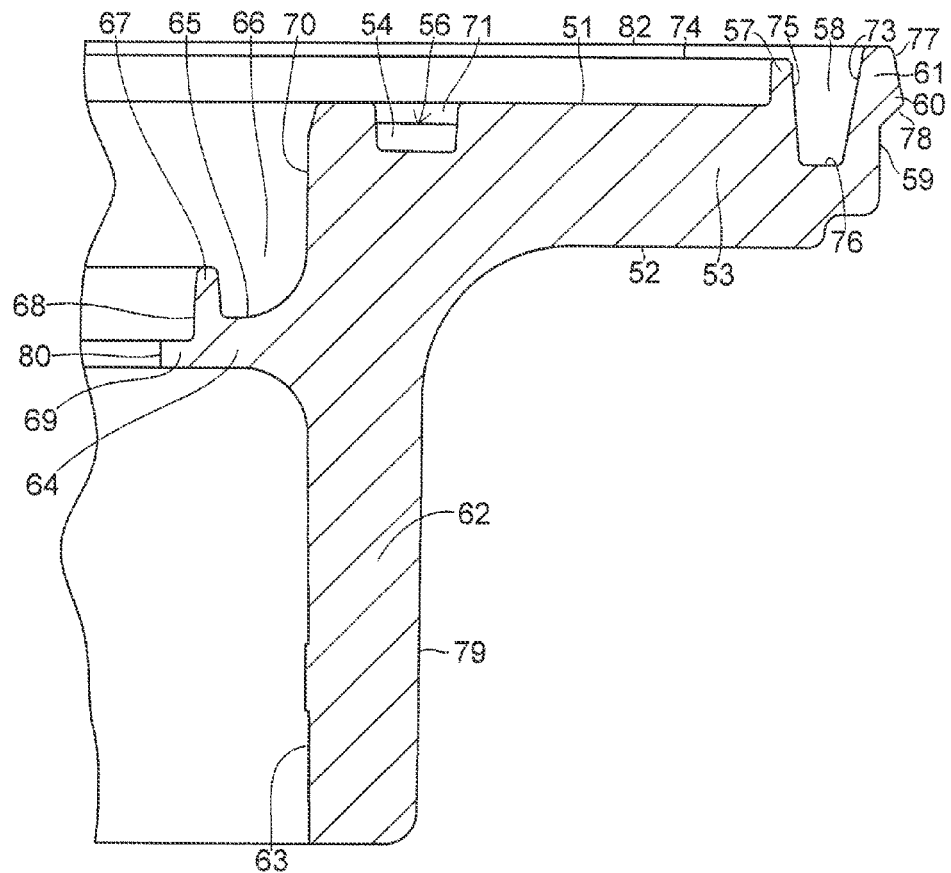
FIG. 9 is an explanatory partially enlarged cross-sectional view of the lower casing shown in FIG. 7.
Figure 10:
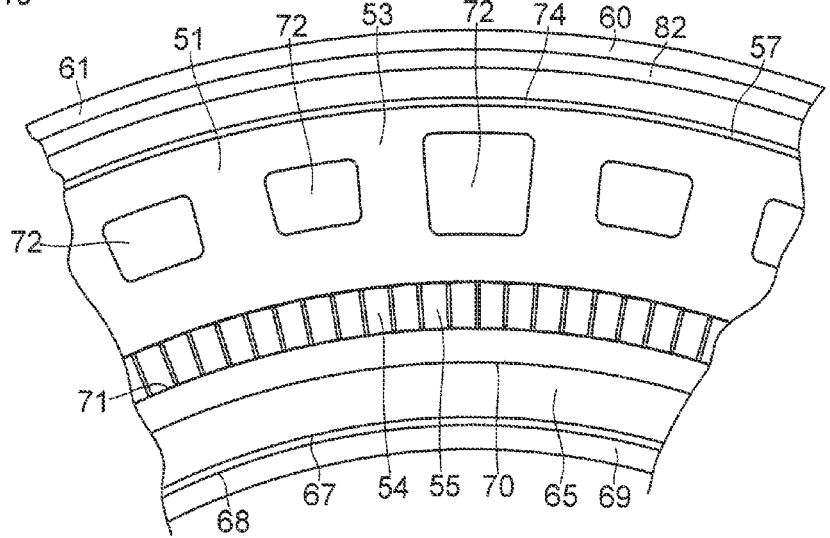
FIG. 10 is an explanatory partially enlarged plan view of the lower casing shown in FIG. 6.
Figure 11:
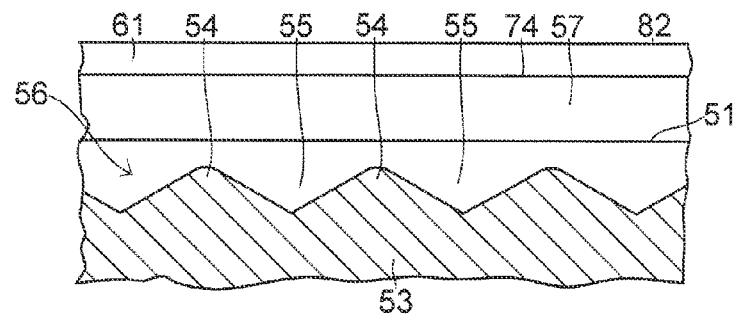
FIG. 11 is an explanatory cross-sectional view, taken in the direction of arrows along line XI-XI, of the lower casing shown in FIG. 6.
Figure 12:
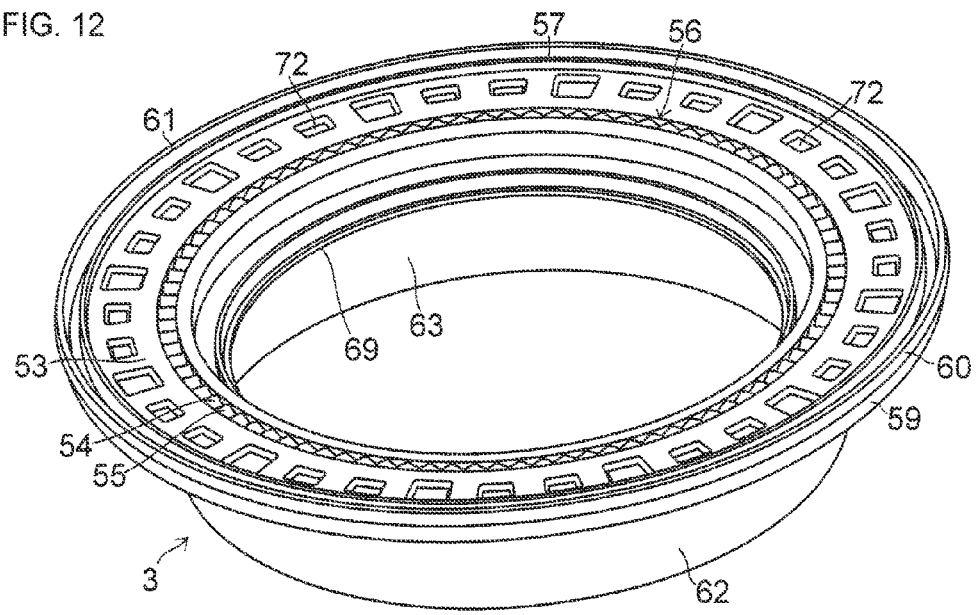
FIG. 12 is an explanatory perspective view of the lower casing of the embodiment shown in FIG. 1.
Figure 13:
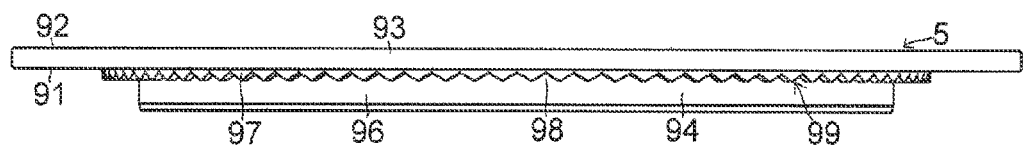
FIG. 13 is an explanatory front view of a sliding bearing piece of the embodiment shown in FIG. 1.
Figure 14:
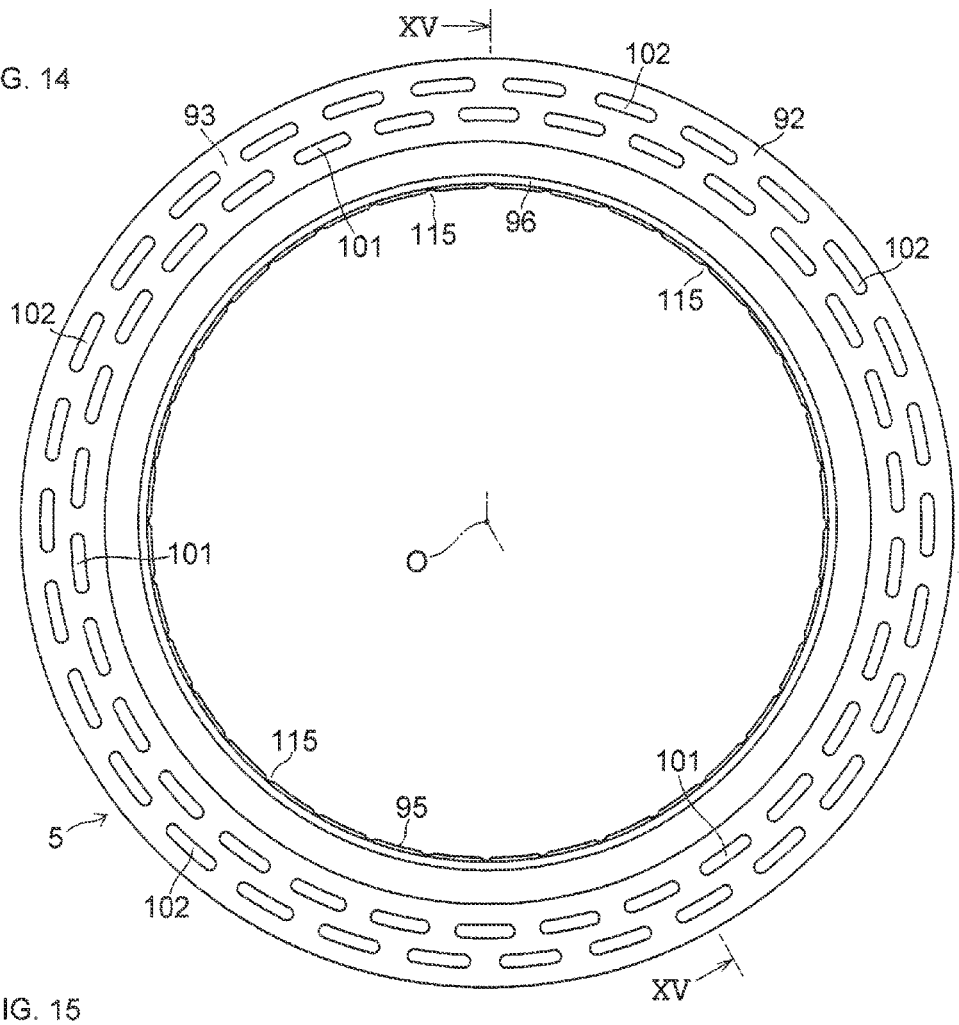
FIG. 14 is an explanatory plan view of the sliding bearing piece shown in FIG. 13.
Figure 15:
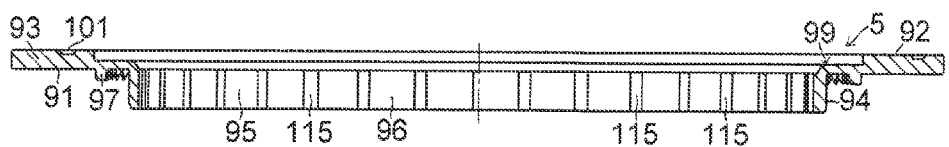
FIG. 15 is an explanatory cross-sectional view, taken in the direction of arrows along line XV-XV, of the sliding bearing piece shown in FIG. 14.
Figure 16:
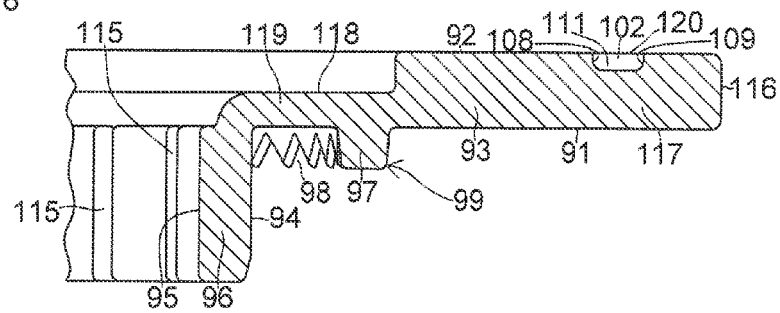
FIG. 16 is an explanatory partially enlarged cross-sectional view of the sliding bearing piece shown in FIG. 15.
Figure 17:
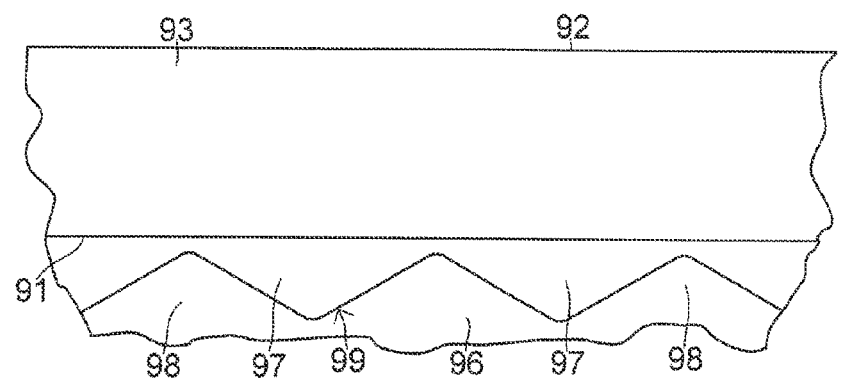
FIG. 17 is an explanatory partially enlarged front view of a corrugated meshing portion formed on the sliding bearing piece shown in FIG. 13.
Figure 18:
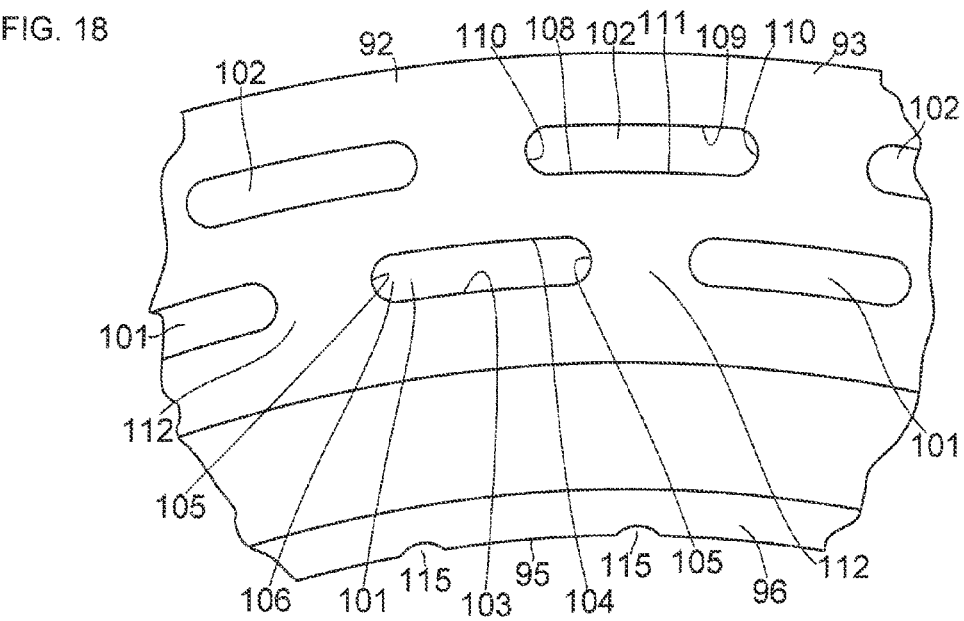
FIG. 18 is a partially enlarged plan view of the sliding bearing piece shown in FIG. 14.
Figure 19:
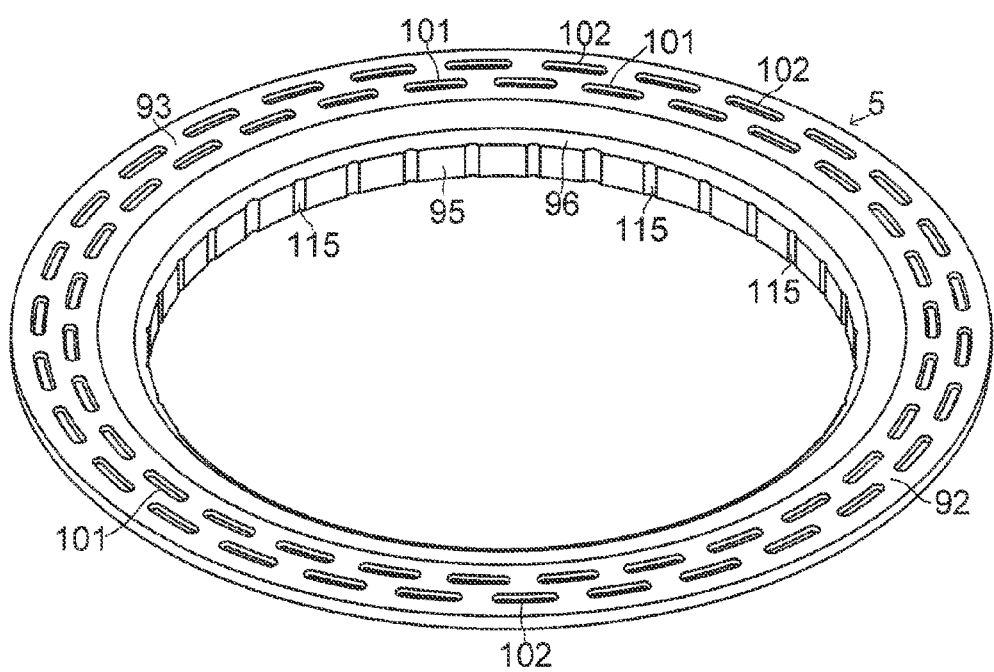
FIG. 19 is an explanatory perspective view of the sliding bearing piece shown in FIG. 13.

As particularly shown in FIGS. 4 and 5, the upper casing 2 integrally includes: an annular upper casing base portion 13 having an annular upper surface 11 and an annular lower surface 12 in an axial direction Y; an inner cylindrical suspended portion 17 which has a cylindrical inner peripheral surface 15 defining a central through hole 14 and a cylindrical outer peripheral surface 16 opposed to the cylindrical inner peripheral surface 15 in a radial direction X and which is suspended from an inner edge portion of the annular lower surface 12 of the upper casing base portion 13; a cylindrical engaging suspended portion 20 which is suspended from an outer edge portion of the annular lower surface 12 of the upper casing base portion 13 and has an engaging bulged portion 19 at a lower portion of a cylindrical inner peripheral surface 18 thereof continuously connected to the annular lower surface 12 of the upper casing base portion 13; an outer cylindrical suspended portion 23 suspended from the annular lower surface 12 of the upper casing base portion 13 so as to form a wide cylindrical recessed portion 21 in cooperation with the cylindrical outer peripheral surface 16 of the inner cylindrical suspended portion 17 and the annular lower surface 12 of the upper casing base portion 13, while forming a narrow cylindrical recessed portion 22 in cooperation with the cylindrical inner peripheral surface 18 of the cylindrical engaging suspended portion 20 and the annular lower surface 12 of the upper casing base portion 13; an inner cylindrical small suspended portion 25 suspended from an annular lower end face 24 of the inner cylindrical suspended portion 17; and an outer cylindrical small suspended portion 27 suspended from the annular lower end face 24 of the inner cylindrical suspended portion 17 so as to form a cylindrical recessed portion 26 in cooperation with the inner cylindrical small suspended portion 25 and the annular lower end face 24 of the inner cylindrical suspended portion 17.

The upper casing base portion 13 includes a thin-walled base portion 31 having the annular lower surface 12 and an annular upper surface 30; a thick-walled base portion 34 formed integrally on the annular upper surface 30 of the thin-walled base portion 31 and having a cylindrical inner peripheral surface 32 and a cylindrical outer peripheral surface 33; a plurality of rib portions 35 formed integrally on the annular upper surface 30 of the thin-walled base portion 31 and the cylindrical inner peripheral surface 32 of the thick-walled base portion 34, respectively, and arranged at equal intervals in the circumferential direction R about the axis O; and a plurality of hole portions 39 which are rectangular in a plan view and are formed in an annular upper surface 36 of the thick-walled base portion 34 by being arranged at equal intervals in the circumferential direction R in two rows in the radial direction X and which are open at that annular upper surface 36 and are each defined by a bottom wall surface 37 in the thick-walled base portion 34 and a pair of inclined wall surfaces 38 which gradually approach each other from the annular upper surface 36 toward the bottom wall surface 37 in the axial direction Y. Thus, the annular upper surface 11 of the upper casing base portion 13 is constituted by the annular upper surface 30 of the thin-walled base portion 31 and the annular upper surface 36 of the thick-walled base portion 34, and the thick-walled base portion 34 is integrally formed on the thin-walled base portion 31 at the annular upper surface 30 of the thin-walled base portion 31. The plurality of hole portions 39 extending in the axial direction Y are designed to make the thickness of the thick-walled base portion 34 as uniform as possible to prevent the occurrence of sink marks and the like during molding to the utmost, and the plurality of ribs 35 reinforce the thick-walled base portion 34 relative to the thin-walled base portion 31.

The cylindrical inner peripheral surface 18 is constituted by an annular inclined surface portion 41 which is gradually enlarged in diameter outwardly in the radial direction X from the annular lower surface 12 toward a lower side, and the engaging bulged portion 19 bulging from the cylindrical inner peripheral surface 18 inwardly in the radial direction X has an annular inclined surface 42 which is continuously connected to the annular inclined surface portion 41 and is gradually reduced in diameter inwardly in the radial direction X from the annular inclined surface portion 41 toward a lower side, as well as an annular inclined surface portion 43 which is continuously connected to the annular inclined surface portion 42 and is gradually enlarged in diameter outwardly in the radial direction X from the annular inclined surface 42 toward a lower side. The cylindrical engaging suspended portion 20 has a cylindrical outer peripheral surface 44 continuously connected to the annular upper surface 30.

As particularly shown in FIGS. 6 to 12, the lower casing 3 includes: an annular lower casing base portion 53 which has an annular upper surface 51 and an annular lower surface 52 in the axial direction Y; a corrugated meshing portion 56 which is formed with projecting portions 54 and indented portions 55 respectively having a triangular shape in a cross-sectional view and alternately arranged on the annular upper surface 51 of the lower casing base portion 53 along the circumferential direction R about the axis O; a cylindrical protrusion 57 protruding from the annular upper surface 51 of the lower casing base portion 53; a cylindrical engaged protruding portion 61 having an engaged bulged portion 60 on an upper portion of a cylindrical outer peripheral surface 59 thereof and projecting from an outer edge portion of the annular upper surface 51 of the lower casing base portion 53 so as to form a cylindrical recessed portion 58 in cooperation with the cylindrical protrusion 57 and the lower casing base portion 53; a cylindrical suspended portion 62 suspended from an inner edge portion of the annular lower surface 52 of the lower casing base portion 53; an annular jutting portion 64 jutting out radially inwardly from a cylindrical inner peripheral surface 63 of the cylindrical suspended portion 62; a cylindrical protrusion 67 protruding from an annular upper surface 65 of the annular jutting portion 64 to form a cylindrical recessed portion 66 in cooperation with the lower casing base portion 53 and the annular jutting portion 64; and an annular jutting portion 69 jutting radially inwardly from a lower edge portion of a cylindrical inner peripheral surface 68 of the annular jutting portion 64.

The lower casing base portion 53 having a cylindrical inner peripheral surface 70 continuously connected to the annular upper surface 65 has an annular recessed portion 71 formed on the annular upper surface 51 in the circumferential direction R about the axis O and a plurality of rectangular recessed portions 72 formed on the annular upper surface 51 at equiangular intervals in the circumferential direction R about the axis O. The projecting portions 54 and the indented portions 55 are formed on the annular upper surface 51 of the lower casing base portion 53 in the annular recessed portion 71. The cylindrical recessed portion 58 is defined by a cylindrical inclined surface 73 of the cylindrical engaged protruding portion 61 which is reduced in diameter from an annular upper surface 82 of the cylindrical engaged protruding portion 61 toward a lower side, a cylindrical inclined surface 75 of the cylindrical protrusion 57 which is enlarged in diameter from an annular upper surface 74 of the cylindrical protrusion 57 toward a lower side, and an annular flat surface 76 of the lower casing base portion 53. The engaged bulged portion 60 has an annular inclined surface 77 which opposes the annular inclined surface 42, is continuously connected to the annular upper surface 82, and is gradually enlarged in diameter outwardly in the radial direction X from the annular upper surface 82 toward a lower side, as well as an annular inclined surface 78 which opposes the annular inclined surface 43, is continuously connected to the annular inclined surface 77, and is gradually reduced in diameter inwardly in the radial direction X from the annular inclined surface 77 toward a lower side. The cylindrical suspended portion 62 has a cylindrical outer peripheral surface 79 continuously connected to the annular lower surface 52; the annular jutting portion 69 has a cylindrical inner peripheral surface 80; and the cylindrical inner peripheral surface 63, the cylindrical inner peripheral surface 68, the cylindrical inner peripheral surface 70, and the cylindrical inner peripheral surface 80 define a central through hole 81 communicating with the central through hole 14.

As particularly shown in FIGS. 13 to 19, the synthetic resin-made sliding bearing piece 5 disposed in the space 4 includes: a thrust sliding bearing piece portion 93 having an annular lower surface 91 in the axial direction Y which is brought into contact with the annular upper surface 51 of the lower casing base portion 53 and an annular upper surface 92 in the axial direction Y which is brought into contact with the annular lower surface 12 of the upper casing base portion 13 slidably in the circumferential direction R about the axis O; a cylindrical radial sliding bearing piece portion 96 which is suspended from an inner edge portion of the annular lower surface 91 of the thrust sliding bearing piece portion 93 and has a cylindrical outer peripheral surface 94 which is brought into contact with the cylindrical inner peripheral surface 70 of the lower casing base portion 53 and a cylindrical inner peripheral surface 95 which is brought into contact with the cylindrical outer peripheral surface 16 of the inner cylindrical suspended portion 17 slidably in the circumferential direction R about the axis O; and a corrugated meshed portion 99 which is formed with projecting portions 97 and indented portions 98 respectively having a triangular shape in a cross-sectional view and alternately arranged on the annular lower surface 91 of the thrust sliding bearing piece portion 93 along the circumferential direction R about the axis O, and which is meshed with the corrugated meshing portion 56 such that the rotation in the circumferential direction R about the axis O relative to the lower casing 3 is prevented by the lower casing 3.

The thrust sliding bearing piece portion 93 has pluralities of inner recessed portions 101 and outer recessed portions 102 which are formed in the annular upper surface 92 along the circumferential direction R about the axis O and in two rows including an inner row and an outer row in the radial direction X, the inner recessed portions 101 and the outer recessed portions 102 being arranged with mutual phase differences in the circumferential direction R about the axis O.

Each of the inner recessed portions 101 formed in the inner row is defined by an inner circular arc-shaped wall surface 103 which extends in a circular arc shape about the axis O as the center; an outer circular arc-shaped wall surface 104 which extends in a circular arc shape about the axis O as the center outwardly of the inner circular arc-shaped wall surface 103 in the radial direction X, i.e., whose diameter is enlarged in the radial direction X relative to the inner circular arc-shaped wall surface 103; a pair of semicircular wall surfaces 105 respectively continuously connected to the inner circular arc-shaped wall surface 103 and the outer circular arc-shaped wall surface 104 and opposed to each other in the circumferential direction R; and a bottom wall surface 106 continuously connected to respective ones of the inner circular arc-shaped wall surface 103, the outer circular arc-shaped wall surface 104, and the pair of semicircular wall surfaces 105.

Each of the plurality of outer recessed portions 102 arranged in the outer row is defined by an inner circular arc-shaped wall surface 108 which extends in a circular arc shape about the axis O as the center; an outer circular arc-shaped wall surface 109 which extends in a circular arc shape about the axis O as the center outwardly of the inner circular arc-shaped wall surface 108 in the radial direction X, i.e., whose diameter is enlarged in the radial direction X relative to the inner circular arc-shaped wall surface 108; a pair of semicircular wall surfaces 110 respectively continuously connected to both the inner circular arc-shaped wall surface 108 and the outer circular arc-shaped wall surface 109 and opposed to each other in the circumferential direction R; and a bottom wall surface 111 continuously connected to respective ones of the inner circular arc-shaped wall surface 108, the outer circular arc-shaped wall surface 109, and the pair of semicircular wall surfaces 110. Each outer recessed portion 102 is arranged at a position corresponding to a discontinuous portion 112 in the circumferential direction R between adjacent ones of the inner recessed portions 101 formed in the inner row. Thus, the inner recessed portions 101 and the outer recessed portions 102 are arranged with phase differences with respect to each other in the circumferential direction R.

The radial sliding bearing piece portion 96 has a plurality of axial grooves 115 which are formed in the cylindrical inner peripheral surface 95 in such a manner as to be spaced apart at equal intervals in the circumferential direction R about the axis O and to be open at their both ends in the axial direction Y, i.e., the vertical direction.

The pluralities of inner recessed portions 101 and outer recessed portions 102 and the plurality of axial grooves 115 serve as a sump section for lubricating oil such as grease.

The thrust sliding bearing piece portion 93 includes a thick-walled thrust sliding bearing piece portion 117 which has, in addition to the annular upper surface 92 and the annular lower surface 91, a cylindrical outer peripheral surface 116 opposing the cylindrical inner peripheral surface of the cylindrical protrusion 57 outwardly in the radial direction X, as well as a thin-walled thrust sliding bearing piece portion 119 which is integrally connected continuously to the thick-walled thrust sliding bearing piece portion 117 inwardly in the radial direction X and has the annular lower surface 91, which is flush with the annular lower surface 91 of the thick-walled thrust sliding bearing piece portion 117 and on which the corrugated meshed portion 99 is formed, as well as an annular upper surface 118 located at a position lower than the annular upper surface 92. The radial sliding bearing piece portion 96 is suspended from an inner edge portion of the annular lower surface 91 of the thin-walled thrust sliding bearing piece portion 119, which constitutes an inner edge portion of the annular lower surface 91 of the thrust sliding bearing piece portion 93. The thin-walled base portion 31 of the upper casing base portion 13 is brought into contact with the annular upper surface 92 of the cylindrical protrusion 57, i.e., the annular upper surface 92 of the thrust sliding bearing piece portion 93 at the annular lower surface 12, slidably in the circumferential direction R about the axis O. The lower casing base portion 53 of the lower casing 3 is respectively brought into contact with the respective annular lower surface 91 of the thick-walled thrust sliding bearing piece portion 117 and the thin-walled thrust sliding bearing piece portion 119, which constitutes the annular lower surface 91 of the thrust sliding bearing piece portion 93 at the annular upper surface 51.

The pluralities of inner recessed portions 101 and outer recessed portions 102, which are formed in the annular upper surface 92 of the thick-walled thrust sliding bearing piece portion 117 of the thrust sliding bearing piece portion 93 along the circumferential direction R and in two rows including the inner row and the outer row in the radial direction X, are arranged such that the ratio of the total area of opening surfaces 120 of the inner recessed portions 101 and the outer recessed portions 102 in a total area combining the opening surfaces 120 of the inner recessed portions 101 and the outer recessed portions 102 and the annular upper surface 92 of the thick-walled thrust sliding bearing piece portion 117, i.e., a thrust sliding bearing surface, is 20 to 50%, preferably 30 to 40%.

Figure 20:
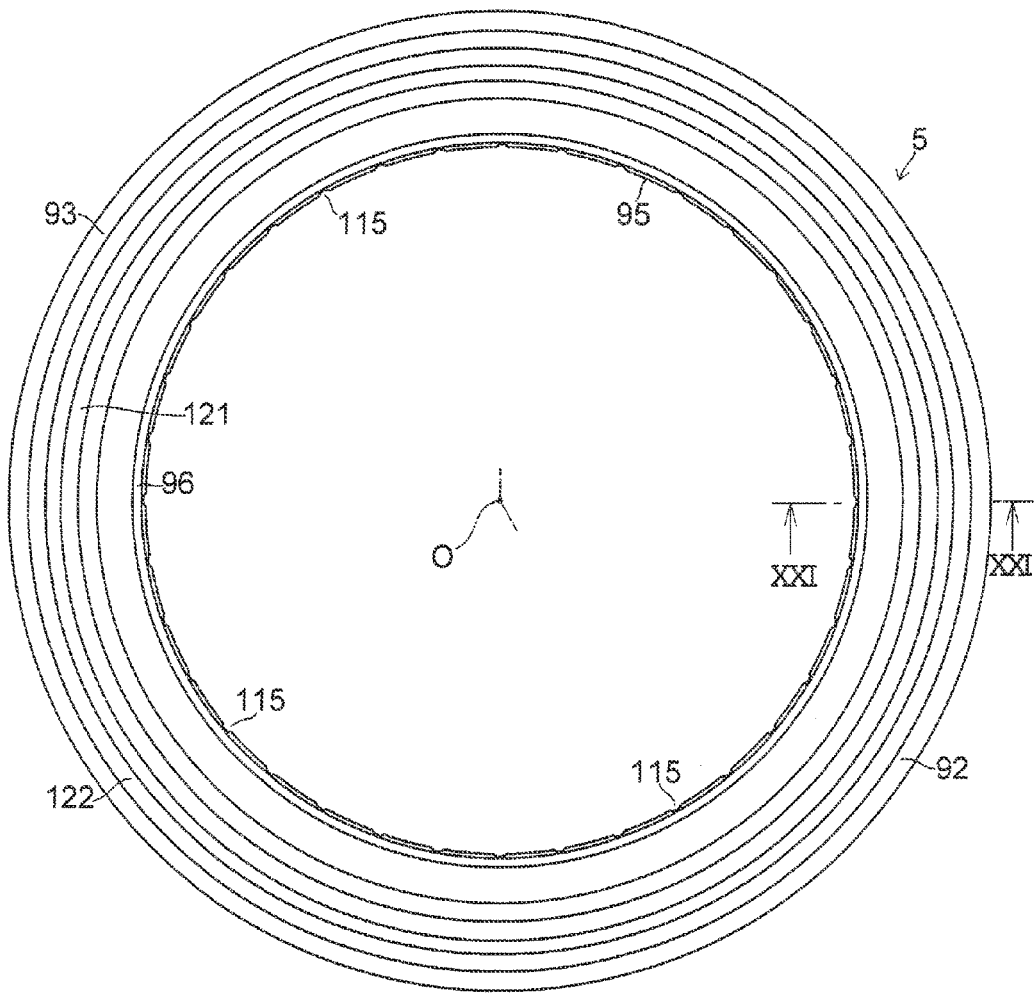
FIG. 20 is an explanatory plan view of another example of the sliding bearing piece of the embodiment shown in FIG. 1.
Figure 21:
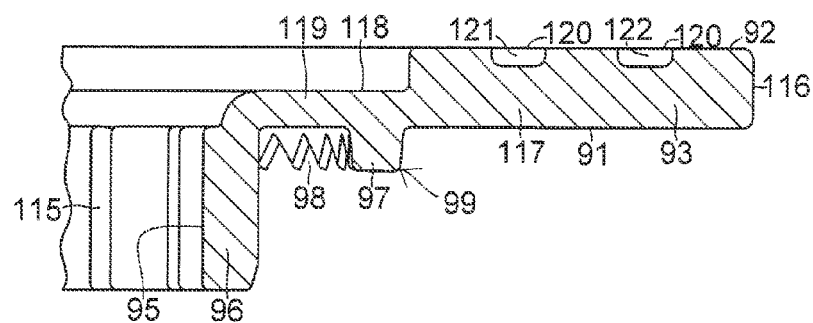
FIG. 21 is an explanatory cross-sectional view, taken in the direction of arrows along line XXI-XXI, of the sliding bearing piece shown in FIG. 20.

As shown in FIGS. 20 and 21, the thrust sliding bearing piece portion 93 of the sliding bearing piece portion 5 may have an inner annular recessed groove 121 and an outer annular recessed groove 122 which are formed in the annular upper surface 92 of the thick-walled thrust sliding bearing piece portion 117 concentrically with each other in such a manner as to extend in the circumferential direction R about the axis O.

The inner annular recessed groove 121 and the outer annular recessed groove 122 are formed such that the ratio of the total area of opening surfaces 120 of the inner annular recessed groove 121 and the outer annular recessed groove 122 in a total area combining the respective opening surfaces 120 of the inner annular recessed groove 121 and the outer annular recessed groove 122 and the annular upper surface 92 of the thick-walled thrust sliding bearing piece portion 117, i.e., a thrust sliding bearing surface, is 20 to 50%, preferably 30 to 40%.

According to the thrust sliding bearing piece portion 93 of the sliding bearing piece 5 thus formed, since the inner recessed portions 101 and outer recessed portions 102, or the inner annular recessed groove 121 and the outer annular recessed groove 122, are formed in the annular upper surface 92, in the relative sliding in the circumferential direction R about the axis O between the annular upper surface 92 of the thrust sliding bearing piece portion 93 and the annular lower surface 12 of the upper casing base portion 13, it is possible to reduce the area of contact between the annular upper surface 92, which is the thrust sliding bearing surface and constitutes the sliding surface, and the mating member, i.e., the annular lower surface 12 of the upper casing base portion 13, thereby making it possible to increase the surface pressure (load per unit area) acting on the annular upper surface 92. Thus, it is possible to attain further lower friction through a combination of the lower friction due to the friction between the synthetic resins and the lower friction due to the presence on the sliding surfaces of the lubricating oil which is filled in the inner recessed portions 101 and the outer recessed portions 102, or the inner annular recessed groove 121 and the outer annular recessed groove 122.

The upper casing 2 is combined with the lower casing 3 by disposing the cylindrical engaged protruding portion 61 in the cylindrical recessed portion 22, by disposing the cylindrical protrusion 67 in the cylindrical recessed portion 26, by disposing the outer cylindrical suspended portion 23 in the cylindrical recessed portion 58, and by resiliently fitting the engaging bulged portion 19 to the cylindrical engaged bulged portion 61.

In the combination of the upper casing 2 and the lower casing 3, as the corrugated meshed portion 99 is meshed with the corrugated meshing portion 56 in the annular recessed portion 71 by disposing the projecting portions 97 on the indented portions 55 of the corrugated meshing portion 56 and by disposing the indented portions 55 on the projecting portions 54 of the corrugated meshing portion 56, the rotation of the sliding bearing piece 5 in the circumferential direction R about the axis O relative to the lower casing 3 is adapted to be prevented.

In such a sliding bearing 1, sealing portions exhibiting labyrinth action on the outer peripheral side and the inner peripheral side are formed by the disposition of the cylindrical engaged protruding portion 61 in the cylindrical recessed portion 22 and by the disposition of the outer cylindrical suspended portion 23 in the cylindrical recessed portion 58 in the section for resiliently fitting the engaging bulged portion 19 to the cylindrical engaged bulged portion 61, as well as by the disposition of the cylindrical protrusion 67 in the cylindrical recessed portion 26. As a result, the ingress of dust, muddy water, and the like into the space 4 is prevented, thereby preventing as practically as possible a decline in the sliding characteristics due to the ingress of dust and the like onto the respective sliding surfaces between the annular upper surface 92 of the thrust sliding bearing piece portion 93 and the annular lower surface 12 of the upper casing base portion 13 and between the cylindrical inner peripheral surface 95 of the radial sliding bearing piece portion 96 and the cylindrical outer peripheral surface 16 of the inner cylindrical suspended portion 17.

In addition, with the sliding bearing 1, since the sliding bearing piece 5 is prevented from rotating in the circumferential direction R about the axis O with respect to the lower casing 3 and is integrated with the lower casing 3, sliding between the sliding bearing piece 5 and the lower casing 3 is prevented, and sliding is hence confined to the sliding between the synthetic resins excellent in the sliding characteristics, i.e., between the annular upper surface 92 of the thrust sliding bearing piece portion 93 and the annular lower surface 12 of the upper casing base portion 13 and between the cylindrical inner peripheral surface 95 of the radial sliding bearing piece portion 96 and the cylindrical outer peripheral surface 17 of the inner cylindrical suspended portion 17.

Figure 22:
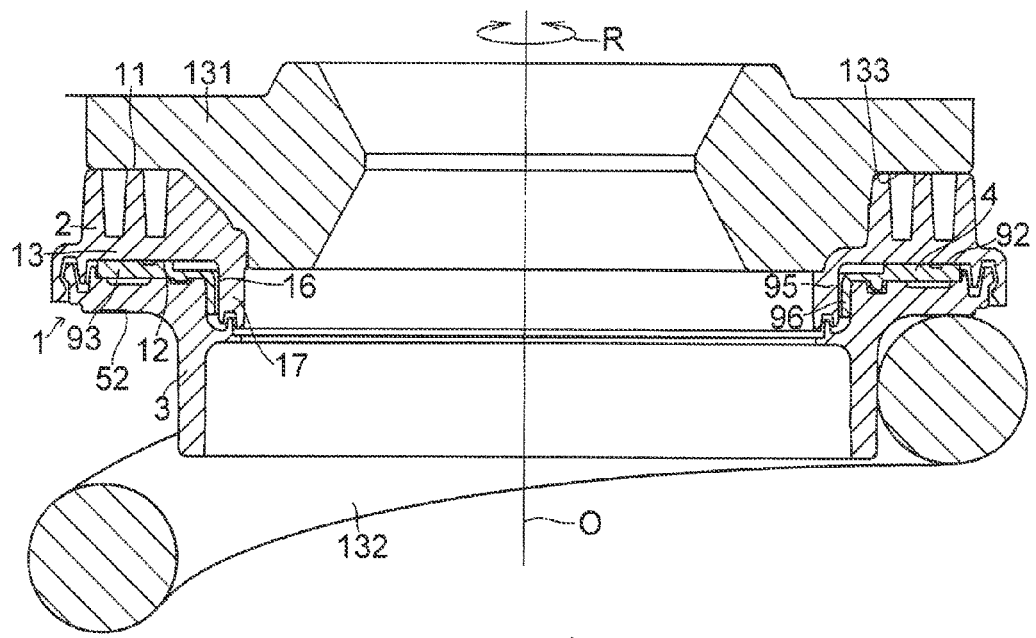
FIG. 22 is an explanatory cross-sectional view in which the sliding bearing shown in FIG. 1 is incorporated in a strut-type suspension.

As shown in FIG. 22, the sliding bearing 1 may be applied to a strut-type suspension in a four-wheeled motor vehicle by disposing the sliding bearing 1 between a vehicle body-side bearing surface 133 of a vehicle body-side mounting member 131 and an upper end portion of a suspension coil spring 132 such that the annular upper surface 11 of the upper casing 2 is brought into contact with the vehicle body-side mounting member 131, and such that the annular lower surface 52 of the lower casing base portion 53 serving as a spring bearing surface is brought into contact with the upper end portion of the suspension coil spring 132.

In the strut-type suspension shown in FIG. 22, the relative rotation in the circumferential direction R of the suspension coil spring 132 with respect to the vehicle body-side mounting member 131 is allowed in the sliding bearing 1 by the relative sliding in the circumferential direction R between the respective synthetic resins, excelling in the sliding characteristics, of the annular upper surface 92 of the thrust sliding bearing piece portion 93 with respect to the annular lower surface 12 of the upper casing base portion 13 and of the cylindrical inner peripheral surface 95 of the radial sliding bearing piece portion 96 with respect to the cylindrical outer peripheral surface 16 of the inner cylindrical suspended portion 17.

DESCRIPTION OF REFERENCE NUMERALS

1: sliding bearing
2: upper casing
3: lower casing
5: sliding bearing piece
13: upper casing base portion
17: inner cylindrical suspended portion
20: cylindrical engaging suspended portion
23: outer cylindrical suspended portion
25: inner cylindrical small suspended portion
27: outer cylindrical small suspended portion
53: lower casing base portion
56: corrugated meshing portion
57: cylindrical protrusion
61: cylindrical engaged protruding portion
62: cylindrical suspended portion
64: annular jutting portion
67: cylindrical protrusion
69: annular jutting portion
93: thrust sliding bearing piece portion
96: radial sliding bearing piece portion
99: corrugated meshed portion

The invention claimed is:

1. A synthetic resin-made sliding bearing comprising: a synthetic resin-made upper casing, a reinforced synthetic resin-made lower casing superposed on said upper casing so as to be rotatable about an axis relative to said upper casing, and a synthetic resin-made sliding bearing piece disposed between said upper casing and said lower casing, wherein said upper casing includes: an annular upper casing base portion; an inner cylindrical suspended portion which has a first cylindrical outer peripheral surface continuously connected to an annular lower surface of the upper casing base portion and is suspended from an inner edge portion of the annular lower surface of the upper casing base portion; a cylindrical engaging suspended portion which is suspended from an outer edge portion of the annular lower surface of the upper casing base portion and has an engaging bulged portion at a lower portion of a first cylindrical inner peripheral surface continuously connected to the annular lower surface of the upper casing base portion; and an outer cylindrical suspended portion suspended from the annular lower surface of the upper casing base portion so as to form a first cylindrical recessed portion in cooperation with the cylindrical engaging suspended portion and the upper casing base portion, wherein said lower casing includes: an annular lower casing base portion; a corrugated meshing portion which is formed with first projecting portions and indented portions and alternately arranged on an annular upper surface of the lower casing base portion along a circumferential direction about the axis; a cylindrical protrusion protruding from the annular upper surface of the lower casing base portion; and a cylindrical engaged protruding portion having an engaged bulged portion on an upper portion of a second cylindrical outer peripheral surface and projecting from an outer edge portion of the annular upper surface of the lower casing base portion so as to form a second cylindrical recessed portion in cooperation with the cylindrical protrusion and the lower casing base portion, and wherein said sliding bearing piece includes: a thrust sliding bearing piece portion having an annular lower surface which is brought into contact with the annular upper surface of the lower casing base portion and an annular upper surface which is slidably brought into contact with the annular lower surface of the upper casing base portion; a cylindrical radial sliding bearing piece portion suspended from an inner edge portion of the annular lower surface of the thrust sliding bearing piece portion and having a second cylindrical inner peripheral surface which is slidably brought into contact with the first cylindrical outer peripheral surface of the first cylindrical suspended portion; and a corrugated meshed portion which is formed with second projecting portions and indented portions alternately arranged on the annular lower surface of the thrust sliding bearing piece portion along the circumferential direction about the axis, and which is meshed with the corrugated meshing portion such that the rotation about the axis relative to said lower casing is prevented by said lower casing, said upper casing being combined with said lower casing by disposing the cylindrical engaged protruding portion in the first cylindrical recessed portion, by disposing the outer cylindrical suspended portion in the second cylindrical recessed portion, and by resiliently fitting the engaging bulged portion to the engaged bulged portion.

2. The synthetic resin-made sliding bearing according to claim 1, wherein said upper casing further includes an inner cylindrical small suspended portion suspended from an annular lower end face of the inner cylindrical suspended portion and an outer cylindrical small suspended portion suspended from an annular lower surface of the inner cylindrical suspended portion to form a third cylindrical recessed portion in cooperation with the inner cylindrical small suspended portion and the inner cylindrical suspended portion, and wherein said lower casing further includes a cylindrical suspended portion suspended from an inner edge portion of the annular lower surface of the lower casing base portion, a first annular jutting portion jutting radially inwardly from a cylindrical inner peripheral surface of the cylindrical suspended portion, another cylindrical protrusion protruding from an annular upper surface of the first annular jutting portion to form a fourth cylindrical recessed portion in cooperation with the lower casing base portion and the first annular jutting portion, and a second annular jutting portion jutting radially inwardly from a lower edge portion of a cylindrical inner peripheral surface of the first annular jutting portion, said upper casing being combined with said lower casing by disposing the other cylindrical protrusion of said lower casing in the third cylindrical recessed portion.

3. The synthetic resin-made sliding bearing according to claim 1, wherein the thrust sliding bearing piece portion has pluralities of inner recessed portions and outer recessed portions which are formed in an annular upper surface thereof along the circumferential direction and in at least two rows including an inner row and an outer row in the radial direction, the inner recessed portions and the outer recessed portions are arranged with phase differences with respect to each other in the circumferential direction about the axis, and the radial sliding bearing piece portion has a plurality of axial grooves which are formed in a second cylindrical inner peripheral surface thereof in such a manner as to be spaced apart at equal intervals in the circumferential direction about the axis and are open at their both ends in a vertical direction.

4. The synthetic resin-made sliding bearing according to claim 3, wherein each of the plurality of inner recessed portions is defined by an inner circular arc-shaped wall surface extending in a circular arc shape about the axis as a center; an outer circular arc-shaped wall surface extending in a circular arc shape about the axis as a center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces.

5. The synthetic resin-made sliding bearing according to claim 3, wherein each of the plurality of outer recessed portions is defined by an inner circular arc-shaped wall surface extending in a circular arc shape about the axis as the center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces.

6. The synthetic resin-made sliding bearing according to claim 3, wherein a ratio of a total area of opening surfaces of the pluralities of inner recessed portions and outer recessed portions in surfaces combining the opening surfaces of the pluralities of inner recessed portions and outer recessed portions and the annular upper surface of the thrust sliding bearing piece portion is 20 to 50%.

7. The synthetic resin-made sliding bearing according to claim 1, wherein the thrust sliding bearing piece portion has at least two annular recessed grooves, including an inner annular recessed groove and an outer recessed groove, which are formed in an annular upper surface thereof concentrically with each other in such a manner as to extend along the circumferential direction about the axis.

8. The synthetic resin-made sliding bearing according to claim 7, wherein a ratio of a total area of opening surfaces of the at least two annular recessed grooves, including the inner annular recessed groove and the outer annular recessed groove, in surfaces combining the opening surfaces of the at least two annular recessed grooves, including the inner annular recessed groove and the outer annular recessed groove, and the annular upper surface of the thrust sliding bearing piece portion is 20 to 50%.

9. The synthetic resin-made sliding bearing according to claim 1, wherein the lower casing base portion has an annular recessed portion formed in an annular upper surface thereof in the circumferential direction about the axis, the first projecting portions and indented portions of the corrugated meshing portion are formed on the annular upper surface of the lower casing base portion in the annular recessed portion, and the corrugated meshing portion is meshed with the corrugated meshed portion in the annular recessed portion.

10. The synthetic resin-made sliding bearing according to claim 1, wherein the thrust sliding bearing piece portion has an annular recessed portion formed in an annular lower surface thereof in the circumferential direction about the axis, the second projecting portions and indented portions of the corrugated meshed portion are formed on the annular lower surface of the thrust sliding bearing piece portion in the annular recessed portion, and the corrugated meshed portion is meshed with the corrugated meshing portion in the annular recessed portion.

* * * * *